United States Patent  
Richardson, III

(10) Patent No.: US 10,858,278 B2  
(45) Date of Patent: Dec. 8, 2020

(54) COMBUSTION BURNER

(71) Applicant: JOHNS MANVILLE, Denver, CO (US)

(72) Inventor: Morris L. Richardson, III, Littleton, CO (US)

(73) Assignee: Johns Manville, Denver, CO (US)

(*) Notice: Subject to any disclaimer, the term of this patent is extended or adjusted under 35 U.S.C. 154(b) by 936 days.

(21) Appl. No.: 14/904,662

(22) PCT Filed: Jul. 18, 2013

(86) PCT No.: PCT/US2013/050994  
§ 371 (c)(1),  
(2) Date: Jan. 12, 2016

(87) PCT Pub. No.: WO2015/009300  
PCT Pub. Date: Jan. 22, 2015

(65) Prior Publication Data  
US 2016/0153654 A1 Jun. 2, 2016

(51) Int. Cl.  
C03B 5/23 (2006.01)  
C03B 5/235 (2006.01)  
F23D 14/78 (2006.01)

(52) U.S. Cl.  
CPC ............ *C03B 5/2356* (2013.01); *F23D 14/78* (2013.01); *C03B 2211/22* (2013.01); *F23D 2214/00* (2013.01); *F23D 2900/00018* (2013.01)

(58) Field of Classification Search  
CPC .................................................. C03B 5/2356  
See application file for complete search history.

(56) References Cited

U.S. PATENT DOCUMENTS 1,706,857 A 3/1929 Mathe  
2,174,533 A 10/1939 See et al.  
(Continued)

FOREIGN PATENT DOCUMENTS

EP 1 337 789 B1 12/2004  
GB 164073 A 5/1921  
(Continued)

OTHER PUBLICATIONS

"Glass Technologies—The Legacy of a Successful Public-Private Partnership", 2007, U.S. Department of Energy, pp. 1-32.  
(Continued)

*Primary Examiner* — John M Hoffmann  
(74) *Attorney, Agent, or Firm* — Robert D. Touslee

(57) ABSTRACT

Submerged combustion burners having a burner body and a burner tip connected thereto. The burner body has an external conduit and first and second internal conduits substantially concentric therewith, forming first and second annuli for passing a cooling fluid therethrough. The burner includes a generally central flow passage for a combustible mixture, the flow passage partially defined by an inner wall of the burner tip. The burner tip has an outer wall and crown connecting the inner and outer walls. The inner and outer walls and crown comprise materials having greater corrosion and/or fatigue resistance than the burner external conduit. The burner tip is connected to the burner body by inner and outer connections, at least one of which includes members interference fit to the burner tip and burner body, the members welded, soldered, or brazed together, in certain instances by fiber laser welding.

14 Claims, 10 Drawing Sheets

(56) References Cited

U.S. PATENT DOCUMENTS

| | | | |
|---|---|---|---|
| 2,269,459 A | 1/1942 | Kleist | |
| 2,321,480 A | 6/1943 | Gaskell | |
| 2,432,942 A | 12/1947 | See et al. | |
| 2,455,907 A | 1/1948 | Slayter | |
| 2,679,749 A | 6/1954 | Poole | |
| 2,718,096 A | 9/1955 | Henry et al. | |
| 2,773,545 A | 12/1956 | Petersen | |
| 2,781,756 A | 2/1957 | Kobe | |
| 2,792,241 A * | 5/1957 | Bondley | F16L 13/04 285/288.6 |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,237,929 A | 3/1966 | Plumat et al. | |
| 3,241,548 A | 3/1966 | See et al. | |
| 3,248,205 A | 4/1966 | Dolf et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,339,616 A | 5/1967 | Ward, Jr. et al. | |
| 3,325,298 A | 6/1967 | Brown | |
| 3,347,660 A | 10/1967 | Smith et al. | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,421,873 A | 1/1969 | Burgman et al. | |
| 3,432,399 A | 3/1969 | Schutt | |
| 3,445,214 A | 5/1969 | Oremesher | |
| 3,498,779 A | 3/1970 | Hathaway | |
| 3,510,393 A | 5/1970 | Burgman et al. | |
| 3,525,674 A | 8/1970 | Barnebey | |
| 3,533,770 A | 10/1970 | Adler et al. | |
| 3,563,683 A | 2/1971 | Hess | |
| 3,592,151 A | 7/1971 | Webber | |
| 3,592,623 A | 7/1971 | Shepherd | |
| 3,606,825 A | 9/1971 | Johnson | |
| 3,617,234 A | 11/1971 | Hawkins et al. | |
| 3,627,504 A | 12/1971 | Johnson et al. | |
| 3,692,017 A | 9/1972 | Giachant et al. | |
| 3,717,139 A | 2/1973 | Guillet et al. | |
| 3,738,792 A | 6/1973 | Feng | |
| 3,746,527 A | 7/1973 | Knavish et al. | |
| 3,752,402 A * | 8/1973 | Marioneaux | C01G 3/06 239/132.3 |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,818,893 A | 6/1974 | Kataoka et al. | |
| 3,835,909 A | 9/1974 | Douglas et al. | |
| 3,840,002 A | 10/1974 | Douglas et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,083,711 A | 4/1978 | Jensen | |
| 4,097,028 A | 6/1978 | Langhammer | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,226,564 A | 10/1980 | Takahashi et al. | |
| 4,238,226 A | 12/1980 | Sanzenbacher et al. | |
| 4,249,927 A | 2/1981 | Fakuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,323,718 A | 4/1982 | Buhring et al. | |
| 4,349,376 A | 9/1982 | Dunn et al. | |
| 4,406,683 A | 9/1983 | Demarest | |
| 4,413,882 A | 11/1983 | Bailey et al. | |
| 4,488,537 A | 12/1984 | Laurent | |
| 4,539,034 A | 9/1985 | Hanneken | |
| 4,542,106 A | 9/1985 | Sproull | |
| 4,545,800 A | 10/1985 | Won et al. | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,735,642 A | 4/1988 | Jensen et al. | |
| 4,738,938 A | 4/1988 | Kunkle et al. | |
| 4,758,259 A | 7/1988 | Jensen | |
| 4,798,616 A | 1/1989 | Knavish et al. | |
| 4,814,387 A | 3/1989 | Donat | |
| 4,816,056 A | 3/1989 | Tsai et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,919,700 A | 4/1990 | Pecoraro et al. | |
| 4,953,376 A | 9/1990 | Merlone | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,169,424 A | 12/1992 | Grinnen et al. | |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,417,565 A * | 5/1995 | Long | F23D 11/46 126/38 |
| 5,449,266 A | 9/1995 | Snyder et al. | |
| 5,483,548 A | 1/1996 | Coble | |
| 5,490,775 A | 2/1996 | Joshi et al. | |
| 5,522,721 A | 6/1996 | Drogue et al. | |
| 5,545,031 A | 8/1996 | Joshi et al. | |
| 5,575,637 A | 11/1996 | Slavejkov et al. | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |
| 5,944,507 A | 6/1999 | Feldermann | |
| 5,944,864 A | 8/1999 | Hull et al. | |
| 5,954,498 A | 9/1999 | Joshi et al. | |
| 5,975,886 A | 11/1999 | Phillippe | |
| 5,979,191 A | 11/1999 | Jian | |
| 5,984,667 A | 11/1999 | Phillippe et al. | |
| 5,993,203 A | 11/1999 | Koppang | |

(56) References Cited

U.S. PATENT DOCUMENTS

| | | |
|---|---|---|
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,461 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,540,265 B2 * | 4/2003 | Turk ................ F16L 19/02 285/280 |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,666 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,778,290 B2 | 6/2010 | Sacks et al. |
| 7,748,592 B2 | 7/2010 | Koga et al. |
| 7,767,606 B2 | 8/2010 | McGinnis et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,645,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,431,049 B2 * | 4/2013 | Citti ................ C04B 35/457 252/520.1 |
| 8,707,739 B2 | 4/2014 | Huber et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0054228 A1 * | 3/2007 | Fogliani ................ F23D 14/06 431/354 |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2012/0132725 A1 | 5/2012 | Dinu |
| 2012/0122490 A1 | 9/2012 | Cole et al. |
| 2013/0086944 A1 | 4/2013 | Shock et al. |

(56) References Cited

U.S. PATENT DOCUMENTS

| | | |
|---|---|---|
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |

FOREIGN PATENT DOCUMENTS

| | | |
|---|---|---|
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |

OTHER PUBLICATIONS

"Glass Melting Technology—A Technical and Economic Assessment," 2004, U.S. Department of Energy, pp. 1-292.

"Glass Industry of the Future", United States Department of Energy, report 02-GA50113-03, pp. 1-17, Sep. 30, 2008.

Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

COMBUSTION BURNER

BACKGROUND INFORMATION

Technical Field

The present disclosure relates generally to the field of combustion burners and methods of use, and more specifically to burners, methods of their manufacture, submerged combustion melters, and methods of their use, particularly for melting glass-forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence and foaming.

In the context of SCMs, SC burners are predominately water-cooled, nozzle mix designs and may avoid premixing of oxidant and fuel for safety reasons due to the increased reactivity of using oxygen as the oxidant versus air. One currently used submerged combustion burner employs a smooth exterior surface, half-toroid metallic burner tip of the same or similar material as the remainder of the burner. When using such burners in an SCM for the manufacture of glass, the burner tip is placed in an extreme environment. The burner tip is exposed to corrosive combustion gases, high temperature glass contact, internal pressure from water or other coolant, vaporization of coolant within the burner tip, thermal cycling, and the like. As a result, it has been determined that thermal fatigue resistance, high melting point, high temperature corrosion/oxidation resistance, high temperature structural strength, and ability to join/fabricate are some of the key requirements for designing next generation SC burners.

Due to these requirements, noble metal alloys have become the focus. However, being expensive alloys, it is not presently economical to fabricate the entire burner using these materials. Because of this, a new challenge has emerged, and it would be an advance in the submerged combustion art to join the noble metal alloy burner tips to common structural materials of burner bodies such as stainless steels and Nickel-based steel alloys without sacrificing other concerns, such as good mechanical strength, coolant leak proofing, and noble metal recovery.

SUMMARY

In accordance with the present disclosure, submerged combustion (SC) burners are described that may reduce or eliminate problems with known SC burners, melters, and methods of using the melters to produce molten glass.

A fluid-cooled combustion burner comprising:

a burner body (6) comprising an external conduit (10) and a first internal conduit (12) substantially concentric therewith, and positioned internal of the external conduit (10), the external conduit (10) comprising a first end (19), a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), the burner body comprising fuel and oxidant inlet ports near the second ends of the conduits, and a third internal conduit (15) substantially concentric with and positioned internal of the second internal conduit (14); and a burner tip (4) defined by an inner wall (28), an outer wall (30), and a crown (32), the outer wall (30) removably fixed to the first end of the external conduit (10) via an outer connection, and the inner wall (28) removably fixed to the first end of the second internal conduit (14) via an inner connection, the burner tip (4) comprising a generally central flow passage configured to pass a combustible mixture therethrough, the generally central flow passage defined by the inner wall (28), the burner tip (4) comprising a corrosion resistant and fatigue resistant material, at least one of the corrosion and/or fatigue resistance being greater than material comprising the external conduit (10) under conditions experienced during submerged combustion melting of glass-forming materials;

wherein the outer connection comprises first and second members (50, 52) interference fit to complementary portions of the burner tip (4) and burner body (6), respectively, the first and second members (50, 52) joined to each other via a heat-formed seam (66).

A fluid-cooled combustion burner comprising:

a burner body comprising an external nickel-based alloy conduit and a first internal nickel-based alloy conduit substantially concentric with the external nickel-based alloy conduit, and positioned internal of the external nickel-based alloy conduit, the external nickel-based alloy conduit comprising a first end, a second end, and a longitudinal bore having a longitudinal axis, the first internal nickel-based alloy conduit comprising a first end, a second end, and a longitudinal bore having a longitudinal axis, the external nickel-based alloy conduit and first internal nickel-based alloy conduit defining a first annulus for passing a cooling fluid there between, and a second internal nickel-based alloy conduit substantially concentric with, and positioned internal of the first internal nickel-based alloy conduit, the second internal nickel-based alloy conduit comprising a first end, a second end, and a longitudinal bore having a longitudinal axis, and configured to define a second annulus between the first and second internal nickel-based alloy conduits, the burner body comprising fuel and oxidant inlet ports near the second ends of the conduits, and a third internal conduit substantially concentric with and positioned internal of the second internal nickel-based alloy conduit; and a platinum-rhodium alloy burner tip defined by a platinum-rhodium alloy inner wall, a platinum-rhodium alloy outer wall, and a platinum-rhodium alloy crown, the platinum-rhodium alloy outer wall removably fixed to the first end of the external nickel-based alloy conduit via an outer connection, and the platinum-rhodium alloy inner wall removably fixed to the first end of the second internal nickel-based alloy conduit via an inner connection, the platinum-rhodium alloy burner tip comprising a generally central flow passage configured to pass a combustible mixture therethrough, the generally central flow passage defined by the platinum-rhodium alloy inner wall;

wherein the outer connection comprises a first member comprising a titanium alloy and a second member comprising a titanium alloy interference fit to complementary portions of the platinum-rhodium alloy burner tip and burner body, respectively, the first member comprising a titanium alloy and the second member comprising a titanium alloy joined to each other via a heat-formed seam.

In embodiments wherein the conduits and outer wall of the burner tip are cylindrical, the members may be rings. Certain burner embodiments may include third and fourth interference fit members or rings as further described herein. Certain other burner embodiments may comprise a primary threaded ring (80) having threads (82) threadedly mated to threads (72) on an extension (70) of conduit (10), and wherein the inner connection comprises a secondary threaded ring (90) having threads (92) threadedly mated to threads (94) on an internal surface of conduit (14). Submerged combustion melters (SCM) comprising at least one fluid-cooled burner of this disclosure, and methods of producing molten glass in the SCMs, are considered aspects of this disclosure.

Another aspect of this disclosure is a method of making a fluid-cooled combustion burner, the method comprising:
(a) forming a first interference fitting of a first member (50) to a shaped end (54) of an outer wall (30) of a burner tip (4) by:
  (i) adjusting temperatures of the first member (50) and burner tip (4) to cause relative dimensions of the first member (50) and shaped end (54) to change so that first member (50) fits around shaped end (54), the first member (50) having smaller initial dimensions than the shaped end (54) of the outer wall (30) of the burner tip (4),
  (ii) placing the first member (50) in position adjacent the shaped end (54) of the outer wall (30), and
  (iii) adjusting temperatures of the first member (50) and shaped end (54) to form the first interference fit;
(b) forming a second interference fitting of a second member (52) to a first end (19) of an external conduit (10) of a burner body (6) by:
  (i) adjusting temperatures of the second member (52) and external conduit (10) to cause relative dimensions of the second member (52) and first end (19) of external conduit (10) to change so that second member (52) fits around first end (19), the second member (52) having smaller initial dimensions than the first end (19) of the external conduit (10) of the burner body (6),
  (ii) placing the second member (52) in position adjacent the first end (19) of the external conduit (10), and
  (iii) adjusting temperatures of the second member (52) and first end (19) of external conduit (10) to form the second interference fit;
(c) positioning the first and second members (50, 52) adjacent each other in mating relationship, forming a seam (66) there between; and
(d) heat-forming the seam (66) by a process selected from welding, soldering, brazing, and combinations thereof.

Certain methods of producing molten glass within the disclosure may include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen. Certain methods of making the burners may include fiber welding of a seam or seams between rings.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
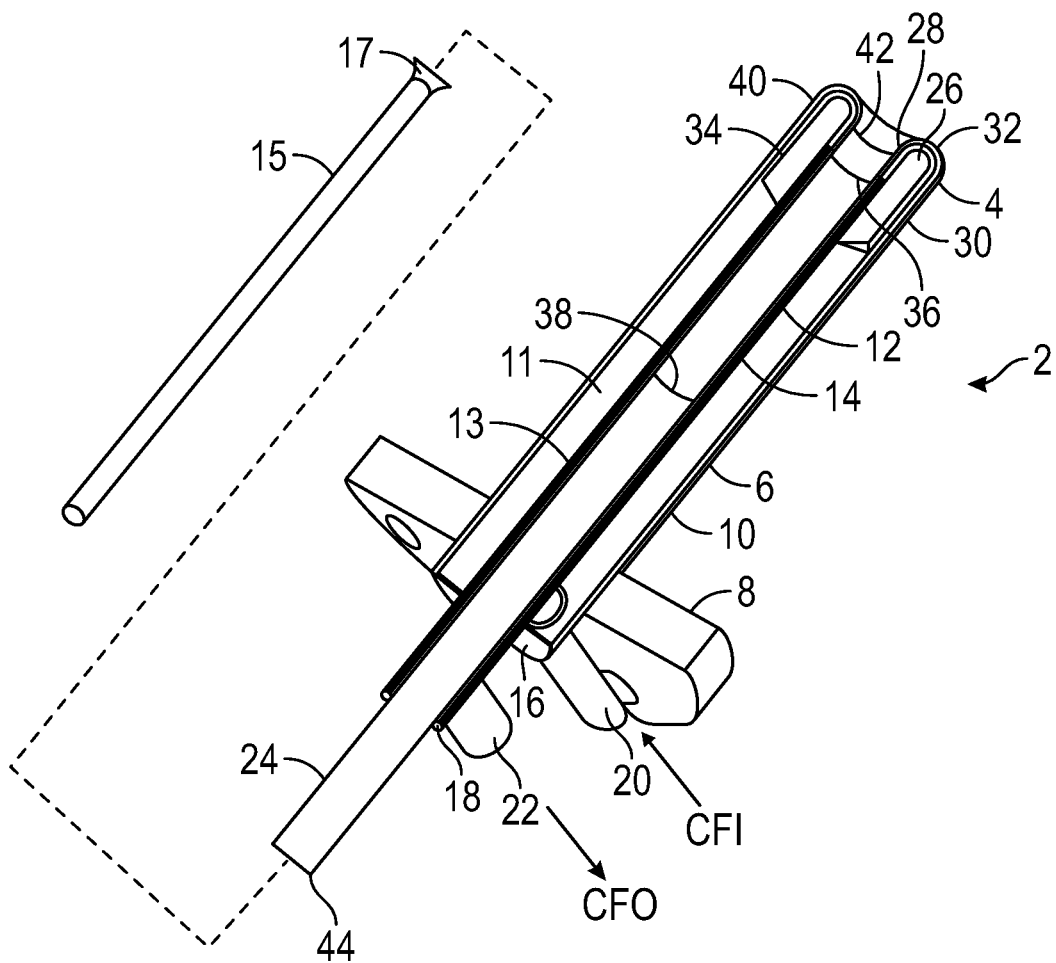
FIG. 1 is a longitudinal cross-section view of fluid-cooled portions of a prior art burner and burner tip, showing typical welded connections between conduits and the burner tip comprising similar mild steel or other base metals, and illustrating a central, substantially concentric fuel or oxidant conduit.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed SC burners, SCMs, and methods. However, it will be understood by those skilled in the art that the apparatus and methods covered by the claims may be practiced without these details and that numerous variations or modifications from the specifically described embodiments may be possible and are deemed within the claims. All U.S. published patent applications, U.S. patents, and international patent applications (Patent Cooperation Treaty) referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass, the burner tip is placed in an extreme environment. Using noble metals and alloys for burner tips presents the additional challenge of attaching the burner tip to the base metal of the remainder of the burner. The present application is devoted to resolving this challenge without sacrificing other concerns, such as good mechanical strength, coolant leak proofing, and noble metal recovery.

The burners and methods disclosed herein allow joining components of dissimilar material types together semi-permanently. Using a combination of advanced machining technology, high tolerances, and temperature adjustment, the methods may be employed for several purposes related to joining dissimilar alloys. Depending on the alloy type and the geometry of the parts that are to be joined, the methods may vary. One specific application of the joining methods described herein is for SC burners.

For example, one burner embodiment may employ a burner tip comprising, or in certain embodiments consisting essentially of, or in other embodiments consisting of an alloy of 80% Platinum and 20% Rhodium (or other platinum-rhodium alloy), and a burner body comprising, or consisting essentially of, or consisting of nickel-based alloy, with first and second rings comprising, or consisting essentially of, or consisting of Titanium 6 series alloy. In certain embodiments, the outer wall of the burner tip may be fitted with a first titanium ring. The fitment of the first titanium ring to the burner tip may be performed by way of interference fitting. Unique to this application, this interference fit may be performed by making the inside diameter of the titanium ring about 0.0005" less than the outside diameter of the mating surface of the outer wall of the burner tip. In one method, the first ring is evenly heated until it reaches the desired size (these properties are related to the expansion coefficient for a circular ring of the material and can be calculated based on designed interference fitment). By then fitting the first ring around the mating surface of the burner tip outer wall and allowing the titanium ring to cool it will create an interference fit without the consequence of creating shearing damage that can cause fitment deterioration over time and under thermal cycles. Similarly, the burner body may be fitted with a second titanium ring. In addition to the interference fitment the burner body and second ring may be designed with interlocking tabs that create a better distributed fitment. This concept can also be implemented in the interference fit of the first ring to the burner tip. In certain embodiments, third and fourth rings may be similarly interference fit to the inner wall of the burner tip and the second internal conduit of the burner body, as further explained herein.

The interference fittings may be made by adjusting the temperatures of the components. In other words, while evenly heating the rings, fitting them where needed, and then cooling may be one method, rather than heating the rings, the burner tip and burner body (or relevant portions thereof) may be cooled sufficiently so that the rings just fit where needed, and then the components allowed to equalize temperature.

In certain embodiments, the first and second rings (and third and fourth rings, if present) are joined together via welding, soldering, or brazing which creates a weld seam of the two titanium rings thus joining the burner tip and burner body in the process. One preferred method of welding the titanium rings is employing a fiber laser to ensure concentration of effective weld area while also limiting distortion; a specifically designed heat sink may be required.

Based on the operational environment of SC burners, the rings may have melting points far above (at least about 20° C., or at least 50° C., or higher) above the melting points of the burner tip and burner body; however, in certain embodiments the thermal expansion coefficient of all materials (rings, burner tip, and burner body) may be close enough to ensure that materials grow (expand) and contract at substantially the same rate. The degree of interference fit may be designed based on the temperature gradients that are identified in a particular SC burner and SCM environment.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted. "Conduit" as used herein includes cylindrical conduits as wells as other shaped conduits, such as square, polygonal, and the like. "Members" may be circular rings or other shapes corresponding to the conduit shape.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

As used herein the term "fiber welding" means joining two metals by localized heating using a "fiber laser." A fiber laser (or fibre laser) is a laser in which the active gain medium is an optical fiber doped with rare-earth elements such as erbium, ytterbium, neodymium, dysprosium, praseodymium, and thulium. Fiber lasers are discussed in U.S. Pat. Nos. 7,027,467; 7,778,290; and 8,279,899.

Burner tips may comprise noble metals and/or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the burner tip may comprise an 80 wt. percent platinum/20 wt. percent rhodium alloy attached to the base metal conduits comprising the burner body using lap joints and brazing, welding or soldering of certain regions of the lap joints, as further explained herein.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of glass melt to be produced. The skilled artisan, having knowledge of the particular application, pressures, temperatures, and available materials, will be able design the most cost effective, safe, and operable burners for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. Preferably, burner tip material that will have a satisfactory service life of at least 12 months under conditions existing in a continuously operating SCM adjacent to the burner tip. As used herein the SCM may comprise a floor, a roof, and a sidewall structure connecting the floor and roof defining an internal space, at least a portion of the internal space comprising a melting zone, and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone.

FIG. 1 illustrates schematically a prior art SC burner having a fluid-cooled portion 2 composed of a burner tip 4 attached to a burner body 6, the SC burner having a longitudinal axis "A" as indicated. A burner main flange 8 connects the burner to an SCM superstructure, not illustrated. Burner body 6 is comprised of an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by the arrow denoted "CFI", and warmed coolant fluid egress, as indicated by an arrow denoted "CFO", respectively. A first annulus 11 is thus formed between substantially concentric external conduit 10 and first internal conduit 12, and a second annulus 13 is formed between substantially concentric first and second internal conduits 12, 14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain embodiments, oxidant flows through the third annulus, while one or more fuels flow through conduit 15, entering through a port 44. In certain other embodiments, one or more fuels flow through the third annulus, while oxidant flows through conduit 15, entering through port 44. Consistent with the definition, "conduits" may have shape other than cylindrical as illustrated.

Still referring to FIG. 1, fluid-cooled portion 2 of the burner includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Burner tip 4 includes an inner wall 28, an outer wall 30, and a crown 32 connecting inner wall 28 and outer wall 30. In prior art burners, welds at locations 34 and 36, and optionally at 38, 40 and 42, connect burner tip 4 to external conduit 10 and second internal conduit 14, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 1 are very limited in the SCM environment, where temperatures of molten glass may reach 1300° C., and the turbulence of the molten glass caused by the burners themselves as well as combustion gases contribute to form a highly erosive environment in contact with the burner tip.

It has now been discovered that a combination of careful selection of burner tip material and type of connections between the burner tip walls and conduits forming the burner body may significantly increase the operating life of SC burners used to melt glass-forming materials in an SCM. This disclosure in particular describes use of members of a third material, different form the material of the burner tip and burner body, to removably fix the burner tip to the burner body.

Specific non-limiting burner, burner tip, SCM and method embodiments in accordance with the present disclosure will now be presented in conjunction with FIGS. 1A and 2-12. The same or similar numerals are used for the same or similar features in the various figures. In the views illustrated in FIGS. 1A, 2-9, 11, and 12, it will be understood in each case that the figures are schematic in nature, and certain conventional features may not be illustrated in order to illustrate more clearly the key features of each embodiment.

Figure 1A:
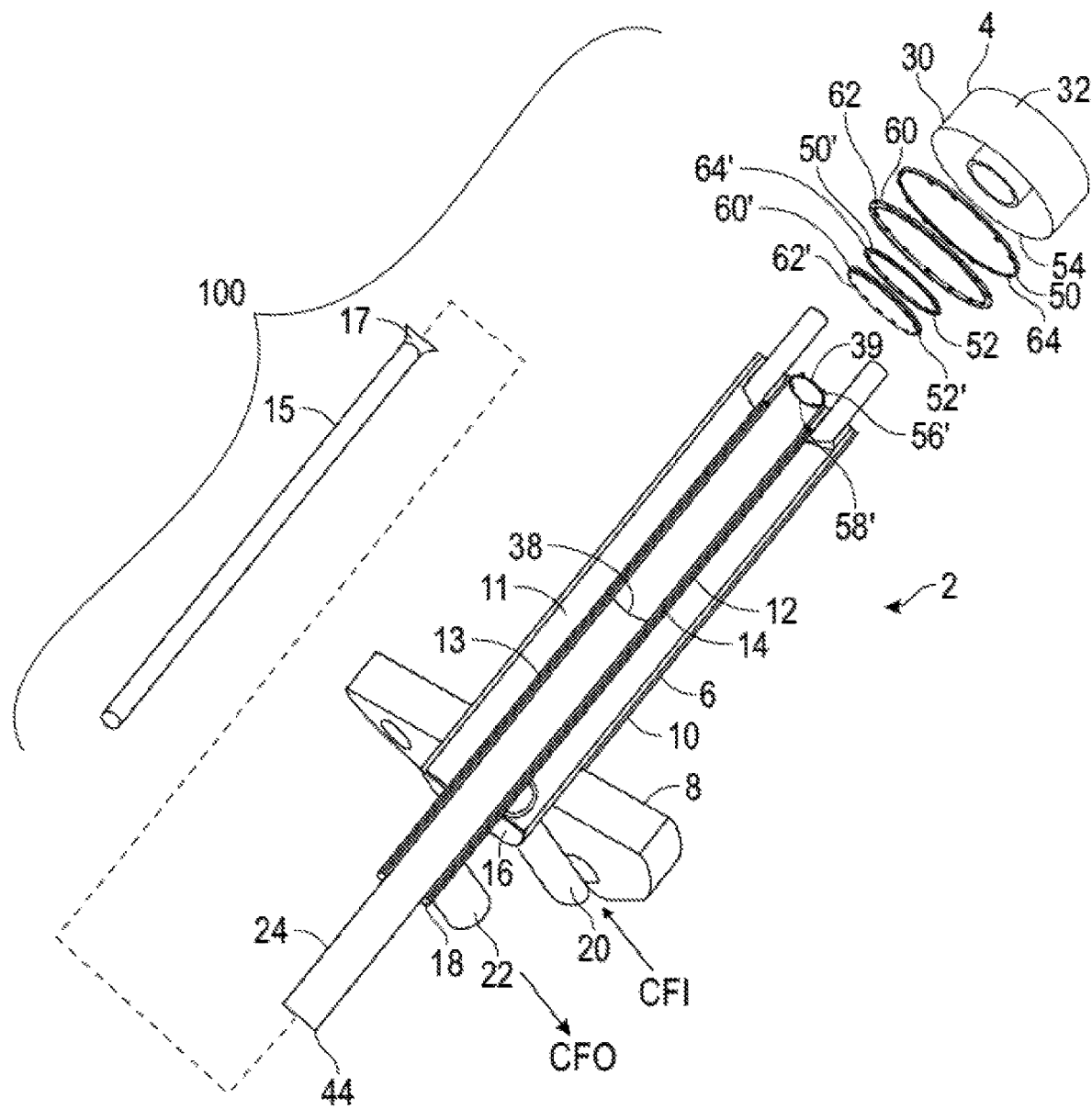
FIG. 1A is a schematic exploded perspective view, partially in cross-section, of one embodiment of a fluid-cooled burner and burner tip in accordance with the present disclosure.

Referring now again to the figures, FIG. 1A is an exploded perspective view of one non-limiting embodiment 100 in accordance with the present disclosure, illustrating a first ring 50 and a second ring 52 for forming an outer connection. While the term "ring" is used, it will be understood that this is simply used for simplicity, and that other shaped members may be employed. First ring 50 interference fits onto a shaped end 54 of outer wall 30 of burner tip 4, while second ring 52 interference fits onto a shaped first end 19 of external conduit 10. It will readily be understood that similar rings may be used for forming an inner connection between inner wall 28 of burner tip 4 and second internal conduit 14. These rings may be referred to herein as third and fourth rings 50', 52'.

Figure 2:
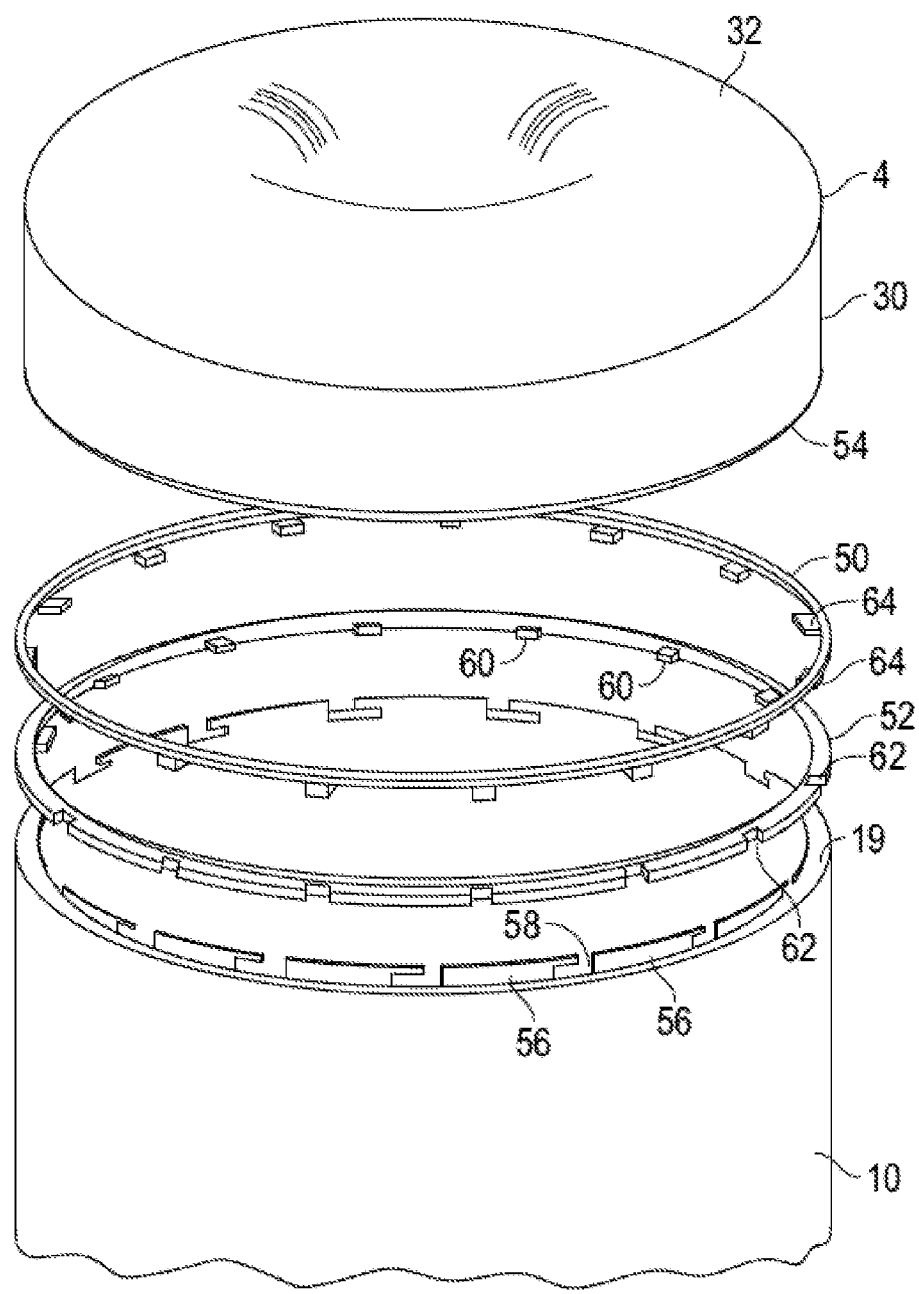
FIG. 2 is a schematic exploded perspective view of a portion of the embodiment illustrated schematically in FIG. 1A in accordance with the present disclosure.

Referring again to FIG. 1A as well as FIG. 2, first ring 50 may include a plurality of mating projections 64 which mate with a corresponding plurality of circumferentially spaced, outward opening receptacles 62 on second ring 52. After interference fitting of first ring 50 to shaped end 54 of outer wall 30, and interference fitting of second ring 52 to first end 19 of external conduit 10, the rings are brought adjacent each other and welded, brazed, or soldered together. Optionally, first end 19 of external conduit 10 may be machined or otherwise shaped to include a plurality of axial projections 56 defining a plurality of slots 58. Slots may in turn receive a plurality of optional interlocking tabs 60 machined or otherwise formed in spaced relationship on second ring 52, as illustrated in FIG. 2. Projections 56, slots 58, and interlocking tabs 60 may serve to form a more robust fitting of second ring 52 to first end 19 of external conduit 10, in addition to the interference fit. Similar projections and slots may be provided on shaped end 54 of outer wall 30, along with optional interlocking tabs on first ring 50.

Third ring 50' may include a plurality of mating projections 64' which mate with a corresponding plurality of circumferentially spaced, outward opening receptacles 62' on fourth ring 52'. After interference fitting of third ring 50' to shaped end 29 (see FIG. 4) of inner wall 28, and interference fitting of fourth ring 52' to first end 39 of second internal conduit 14, the rings are brought adjacent each other and welded, brazed, or soldered together. Optionally, first end 39 of second internal conduit 14 may be machined or otherwise shaped to include a plurality of axial projections 56' (similar to shaped projections 56) defining a plurality of slots 58' (similar to slots 58). Slots 58' may in turn receive a plurality of optional interlocking tabs 60' machined or otherwise formed in spaced relationship on fourth ring 52', as illustrated in FIG. 1A. Projections 56', slots 58', and interlocking tabs 60' may serve to form a more robust fitting of fourth ring 52' to first end 39 of second internal conduit 14, in addition to the interference fit. Similar projections and slots may be provided on shaped end 29 of inner wall 28, along with optional interlocking tabs on third ring 50'.

Figure 3:
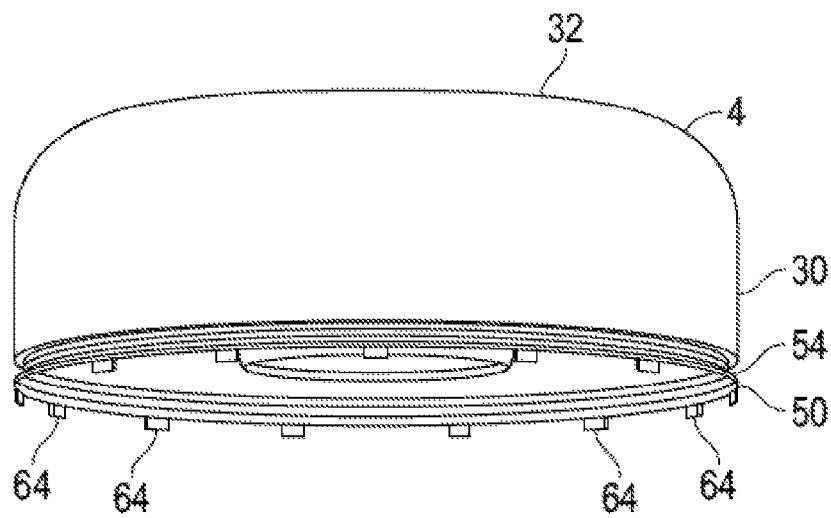
FIG. 3 is an exploded perspective view of a portion of the portion of the embodiment illustrated in FIG. 1A.
Figure 4:
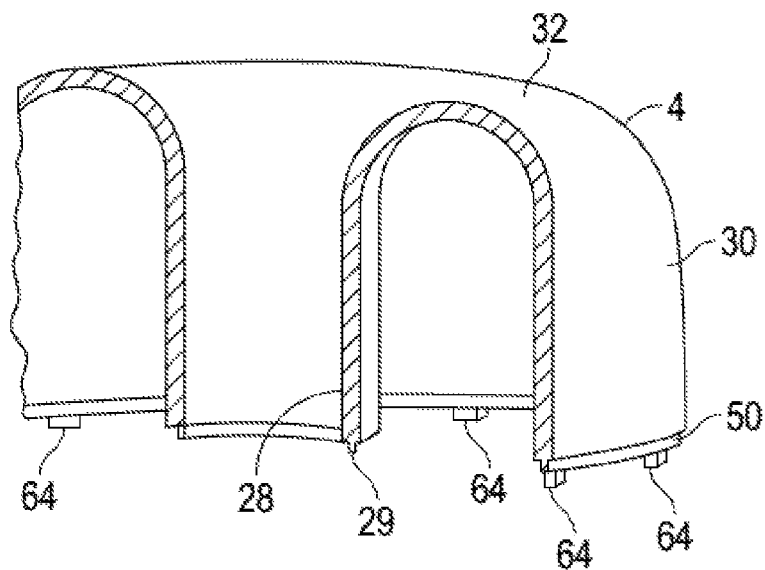
FIG. 4 is a perspective view, partially in cross-section, of the components illustrated in FIG. 3 assembled after interference fitting.

FIG. 3 is an exploded perspective view of a portion of embodiment 100 illustrated in FIG. 1A, and FIG. 4 is a perspective view, partially in cross-section, of the components illustrated in FIG. 3 assembled after interference fitting of first ring 50 to shaped end 54 of outer wall 30. FIG. 4 in particular illustrates that inner wall 28 may have a shaped end 29 for accepting a third ring 50'.

Figure 5:
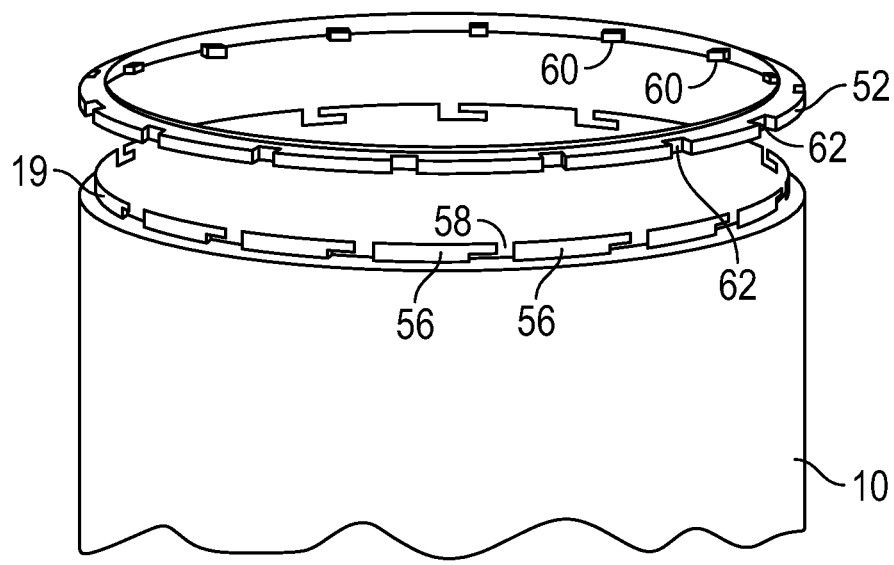
FIG. 5 is an exploded perspective view of another portion of the portion of the embodiment illustrated in FIG. 1A.
Figure 6:
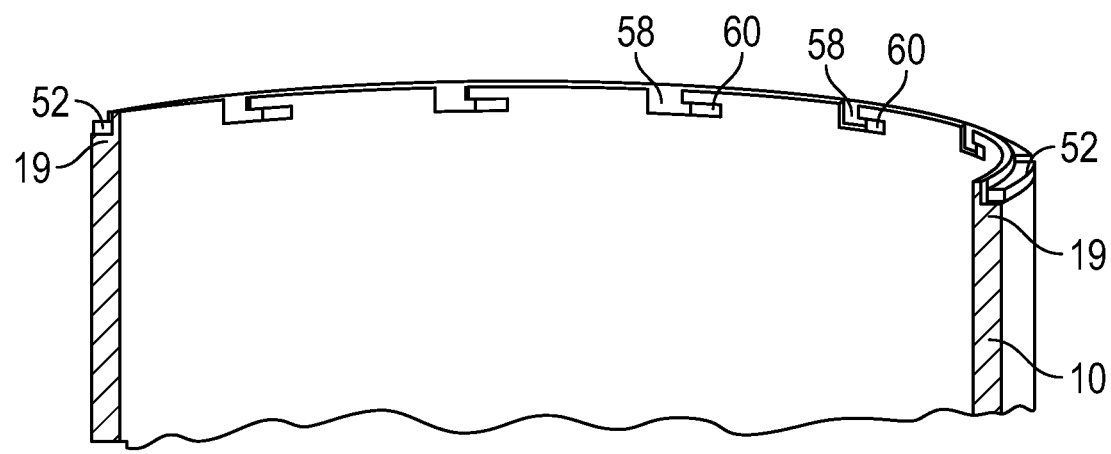
FIG. 6 is a perspective view, partially in cross-section, of the components illustrated in FIG. 5 assembled after interference fitting.

FIG. 5 is an exploded perspective view of another portion of embodiment 100 illustrated in FIG. 1A, and FIG. 6 is a perspective view, partially in cross-section, of the components illustrated in FIG. 5 assembled after interference fitting of second ring 52 to shaped first end 19 of outer conduit 10. Interlocking tabs 60 are clearly illustrated on second ring 52, inserted into respective slots 58.

Figure 7:
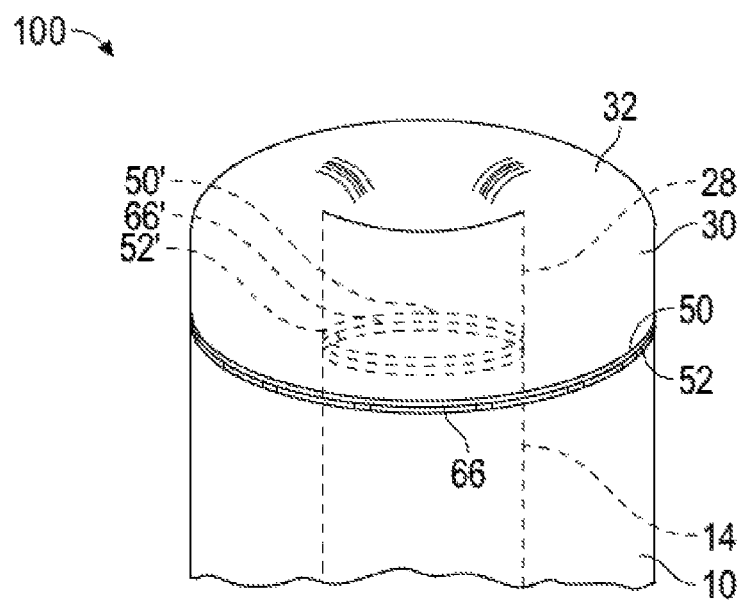
FIG. 7 is a perspective view, partially in phantom.
Figure 8:
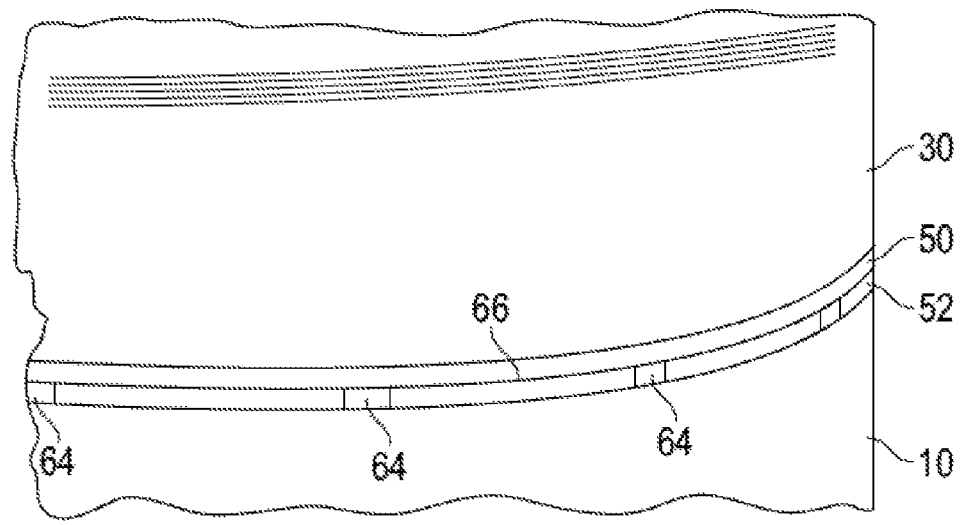
FIG. 8 is a detailed perspective view, of the embodiment of FIG. 1A.

FIG. 7 is a perspective view, partially in phantom, and FIG. 8 is a detailed perspective view, of embodiment 100 in assembled status, illustrating a seam 66 formed between first and second rings 50, 52, and a second seam 66' formed between third and fourth rings 50', 52'. In preferred embodiments, first and second rings 50, 52 may be welded, brazed, or soldered, but particularly preferred is fiber laser welding of seam 66. Third and fourth rings 50', 52' may be welded, brazed, or soldered, but particularly preferred is fiber laser welding of seam 66'. Fiber laser welding may ensure concentration of effective weld area while also limiting distortion; a specifically designed heat sink may be required, for example to be placed inside the inside diameter of the rings. Suitable fiber laser systems that may be used include those known under the trade names FIBERSTAR 7500 and FIBERSTAR 7600 fiber laser welding machines, available from LaserStar Technologies Corporation, Riverside, R.I. (USA). As explained on the LaserStar Internet website, fiber laser welding technology produces a sharp, focused light beam that consistently melts a very small area of metal. The benefit of the technology is that very little heat is generated at the weld point allowing users to easily laser weld >0.025 mm from complex, heat sensitive, intricate parts. Some of the technical specifications for the "7500" system are provided in Table 1. The system may be accompanied by a projection microscope known under the trade designation EZ-VIEW, and software known under the trade designation PULSE PERFORMANCE PROFILE TECHNOLOGY, also available from LaserStar. The software is an imbedded software feature that may be used to shape the wave profile for each laser pulse discharge.

TABLE 1

Technical specifications of the fiber laser system known under the trade designation FIBERSTAR 7500, available from FiberStar Technologies Corporation

| | |
|---|---|
| System Platform | Pedestal |
| Welding Chamber Safety Certification | Class 1 |
| FiberStar Lasing System | Class 4 |
| Beam Delivery Presentation | 90 degree |
| Wavelength | 1,090 μm (+/−5 μm) |
| Operating Mode | Pulse or Continuous Wave (CW) |

TABLE 1-continued

Technical specifications of the fiber laser system known under the trade designation FIBERSTAR 7500, available from FiberStar Technologies Corporation

| System Platform | Pedestal |
|---|---|
| Output Power | 100-400 Watt (Pulse or CW) |
| Polarization | Random |
| Output Power Stability | <2% |
| Closed Loop Pulse Control | Integrated Circuit/Software |
| $M^2$ | 1.1 nominal, <1.2 maximum |
| Pulse Length | 0.5-250 Milli-seconds |
| Pulse Frequency | 0.5-20 Hz |
| Burst (Count) Mode | 1-25 pulses |
| Beam Diameter ($1/e^2$) | .025-2.0 mm |
| Cooling System | Internal Forced Air (100 & 200 Watt) Close-Loop Water Cooled (300 & 400 Watt) |
| Cooling Capacity-Run Time | 24 Hour/Continuous |
| Supply Circuit | 120 V (+/−10%), 50/60 Hz 15 Amp, Single Phase 208 V (+/−5%) or 230 V (+/−10%) 50/60 Hz, 20 Amp, Single Phase |
| Binocular Microscope (3 versions) | 15x (optional 25x, 40x) |
| Chamber Illumination System | Fluorescent & Halogen |
| Parameter Adjustment Feature | External Keypad Internal Chamber Joysticks |
| Programming Memory | 80 Text Cells |
| Motorized Beam Expander | Yes |
| Shield Gas Supply | Integrated "Soft Flow" Nozzle |
| Inter Gas Welding Chamber Adjust Valve | Dual - Integrated |
| Welding Chamber Dimensions | 13.3"L × 13.6"W × 7.5" H 337 mm × 346 mm × 178 mm |
| Pedestal Workstation "Footprint" Dimensions | 37.5"L × 15.8"W × 44"H 952 mm × 401 mm × 1117 mm |
| Weight (Unpackaged) | 265 lbs/120 Kg |
| Laser Safety Certification Compliance | FDA(CDRH), UL, CSA, CE |

Figure 9:
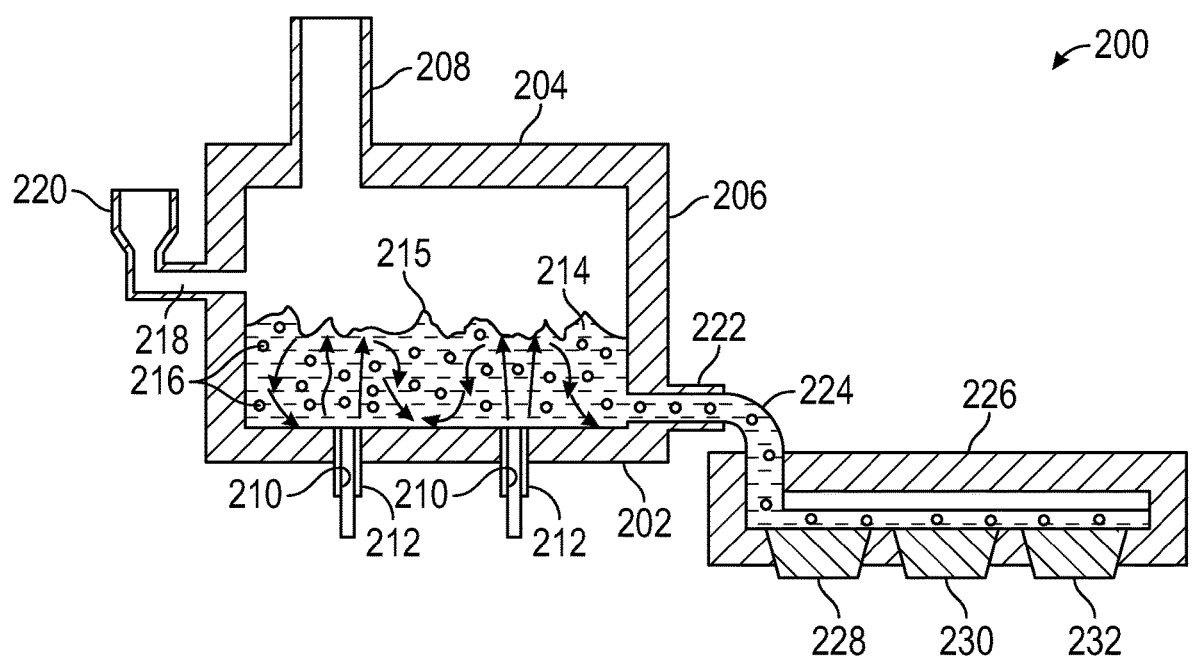
FIG. 9 is a side elevation view, partially in cross-section, of an SCM employing an SC burner in accordance with the present disclosure.

FIG. 9 illustrates system embodiment 200 comprising an SCM having a floor 202, a roof or ceiling 204, a wall 206 having a feed opening 218, and a feeder 220 for feeding batch, cullet, waste material, or combination thereof. System embodiment 200 further includes an exhaust stack 208, and openings 210 for two (or more, not illustrated) floor-mounted and/or sidewall-mounted submerged combustion burners 212, which create during operation a highly turbulent melt indicated at 214, with a turbulent surface 215. In certain embodiments, floor-mounted burners 212 may be positioned to emit combustion products into molten glass in the melting zone 214 in a fashion so that the gases penetrate the melt generally perpendicularly to floor 202. In other embodiments, one or more floor-mounted burners 212 may emit combustion products into the melt at an angle to floor 202, where the angle may be more or less than 45 degrees, but in certain embodiments may be 30 degrees, or 40 degrees, or 50 degrees, or 60 degrees, or 70 degrees, or 80 degrees. Burners 212 may be air-fuel burners or oxy-fuel burners, or some combination thereof, as further described herein. Embodiment 200 further includes a melter exit structure 222 for discharging the molten glass or similar material 224 including a plurality of gaseous bubbles 216 directly into a forehearth 226. Melter exit structure 222 is positioned generally downstream of melter turbulent zone 214 as illustrated of FIG. 9, and may or may not be mechanically connected to forehearth 226. No molten glass-conditioning channel is included between melter exit structure 222 and forehearth 226 in embodiment 200, but this may not be true in all embodiments, as embodiment 200 is configured to manufactured foamed glassed articles. Completing system 200 are one or more bushings on a lower portion of forehearth 226, system 200 having three bushings 228, 230, and 232, for producing hollow fibers, or fibers having regions substantially devoid of glass. Other glass forming operations may be fed by the SCM, this being merely an example arrangement.

Melter 200 includes floor-mounted submerged combustion burners 210. In certain embodiments, burners 210 may be positioned to emit combustion products into molten glass in the melting zone in a fashion so that the gases penetrate the melt generally perpendicularly to the floor. In other embodiments, one or more burners 210 may emit combustion products into the melt at an angle to the floor, where the angle may be more or less than 45 degrees, but in certain embodiments may be 30 degrees, or 40 degrees, or 50 degrees, or 60 degrees, or 70 degrees, or 80 degrees.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zones and serve as ignition sources for one or more submerged combustion burners 210. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 210. In certain embodiments, if there is a possibility of carryover of batch particles to the exhaust, one or more roof-mounted burners could be used to form a curtain to prevent particulate carryover. In certain embodiments, all submerged combustion burners 210 are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain embodiments, in certain melter zones.

Suitable materials for glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry, and type of glass to be produced, may dictate the choice of a particular material, among other parameters.

The term "fluid-cooled" means use of a coolant fluid (heat transfer fluid) to transfer heat away from the burner exterior conduit and burner tip. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more burners in the SCM and/or flow channel(s) downstream thereof may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

Certain SCMs and/or flow channels may employ one or more high momentum, non-submerged burners, for example, to impinge on portions of a foam layer. High momentum burners useful in apparatus, systems, and methods of this disclosure include those disclosed in Applicant's U.S. patent application Ser. No. 13/268,130, filed Oct. 7, 2011 now U.S. Pat. No. 9,021,838, issued May 5, 2015. As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain SCMs and method embodiments of this disclosure may include fluid-cooled panels such as disclosed in Applicant's U.S. patent application Ser. No. 12/817,754, filed June 1.7, 2010, now U.S. Pat. No. 8,769,992, issued Jul. 8, 2014. In certain system and process embodiments, the SCM may include one or more adjustable flame submerged combustion burners comprising one or more oxy-fuel combustion burners, such as described in Applicant's U.S. patent application Ser. No. 13/268,028, filed Oct. 7, 2011, now U.S. Pat. No. 8,875,544, issued Nov. 4, 2014. In certain systems and processes, the SCM may comprise a melter exit structure designed to minimize impact of mechanical energy, such as described is Applicant's U.S. patent application Ser. No. 13/458,211, filed Apr. 27, 2012, now U.S. Pat. No. 9,145,319, issued Sep. 29, 2015. In certain systems and processes, the flow channel may comprise a series of sections, and may comprise one or more skimmers and/or impingement (high momentum) burners, such as described in Applicant's U.S. patent application Ser. No. 13/268,130, filed Oct. 7, 2011, now U.S. Pat. No. 9,021,838, issued May 5, 2015 and Ser. No. 13/493,170, filed Jun. 11, 2012, now U.S. Pat. No. 8,707,739, issued Apr. 29, 2014, and reissued U.S. Pat. No. RE46,462, issued Jul. 7, 2017. Certain systems and processes of the present disclosure may utilize measurement and control schemes such as described in Applicant's U.S. patent application Ser. No. 13/493,219, filed Jun. 11, 2012, now U.S. Pat. No. 9,096,453, issued Aug. 4, 2015 and/or feed batch densification systems and methods as described in Applicant's U.S. patent application Ser. No. 13/540,704, filed Jul. 3, 2012, now U.S. Pat. No. 9,643,869, issued May 9, 2017. Certain SCMs and processes of the present disclosure may utilize devices for delivery of treating compositions such as disclosed in Applicant's U.S. patent application Ser. No. 13/633,998, filed Oct. 3, 2012, now U.S. Pat. No. 8,973,405, issued Mar. 10, 2015.

Figure 10:
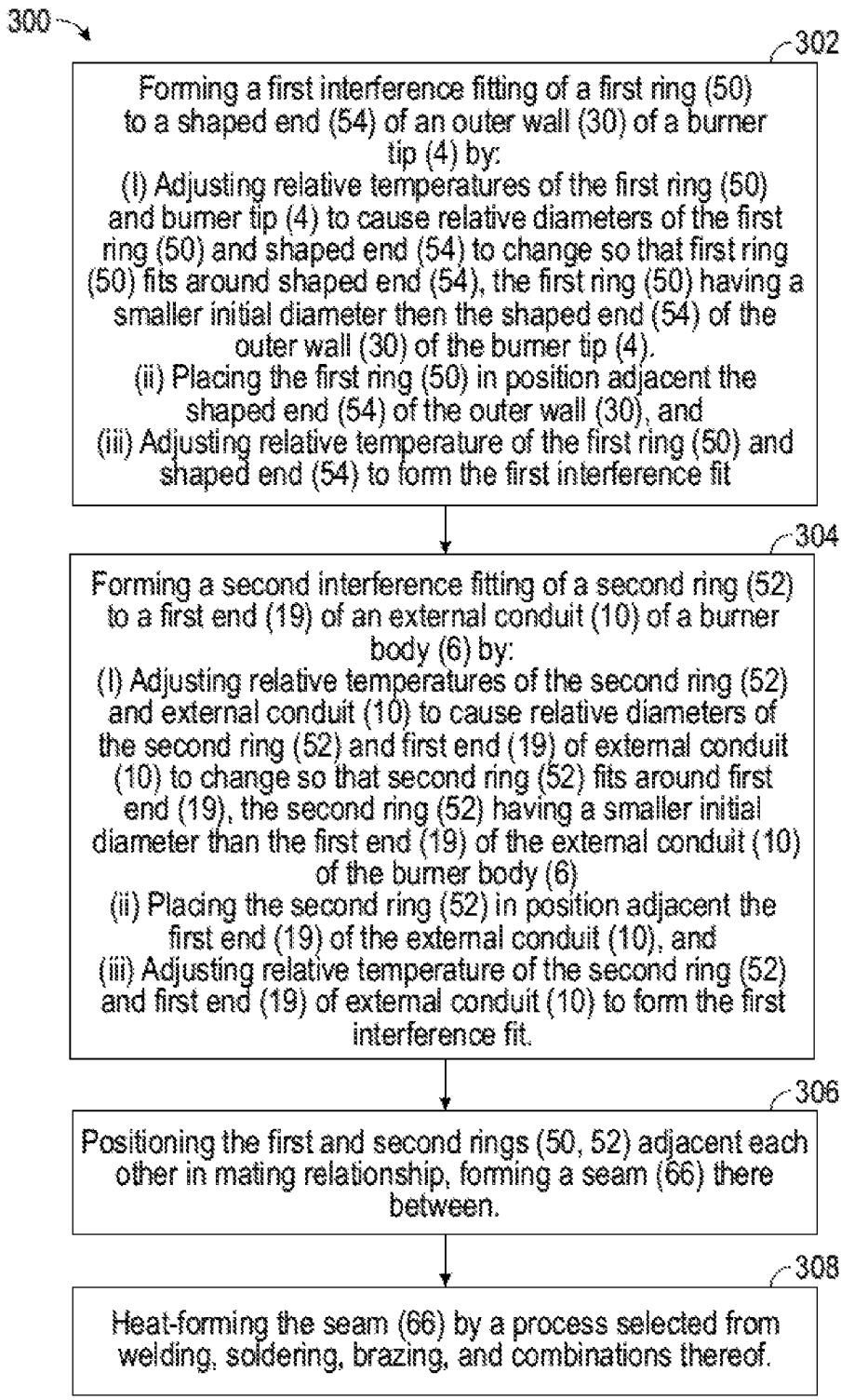
FIG. 10 is a logic diagram of a method of making an SC burner of this disclosure.

Methods of making a fluid-cooled submerged combustion burner using interference fittings are considered another aspect of the present disclosure. As illustrated in FIG. 10, one method embodiment 300 may include the steps of:
(a) forming a first interference fitting of a first ring (50) to a shaped end (54) of an outer wall (30) of a burner tip (4) by:
 (i) adjusting temperatures of the first ring (50) and burner tip (4) to cause relative diameters of the first ring (50) and shaped end (54) to change so that first ring (50) fits around shaped end (54), the first ring (50) having a smaller initial diameter than the shaped end (54) of the outer wall (30) of the burner tip (4),
 (ii) placing the first ring (50) in position adjacent the shaped end (54) of the outer wall (30), and
 (iii) adjusting temperatures of the first ring (50) and shaped end (54) to form the first interference fit (box 302);
(b) forming a second interference fitting of a second ring (52) to a first end (19) of an external conduit (10) of a burner body (6) by:
 (i) adjusting temperatures of the second ring (52) and external conduit (10) to cause relative diameters of the second ring (52) and first end (19) of external conduit (10) to change so that second ring (52) fits around first end (19), the second ring (52) having a smaller initial diameter than the first end (19) of the external conduit (10) of the burner body (6), (ii) placing the second ring (52) in position adjacent the first end (19) of the external conduit (10), and (iii) adjusting temperatures of the second ring (52) and first end (19) of external conduit (10) to form the first interference fit; (box 304)

(c) positioning the first and second rings (50, 52) adjacent each other in mating relationship, forming a seam (66) there between (box 306); and (d) heat-forming the seam (66) by a process selected from welding, soldering, brazing, and combinations thereof (box 308).

Certain methods may comprise cooling the burner tip and burner body from a first temperature to a second, lower temperature, so that they contract in order that rings having initial diameters slightly smaller than diameters of the burner tip and burner body when at the first temperature will just fit around their respective counterparts when at the second temperature, and then allowing the burner tip and burner body to return to the first temperature. Alternatively, other methods may comprise heating the rings from a first temperature to a second, higher temperature, so that the rings expand in order that the rings, having initial diameters slightly smaller than diameters of the burner tip and burner body when at the first temperature will just fit around their respective counterparts when at the second temperature, and then allowing the burner tip and burner body to return to the first temperature. Yet other methods may employ a combination of these two methods.

Figure 11:
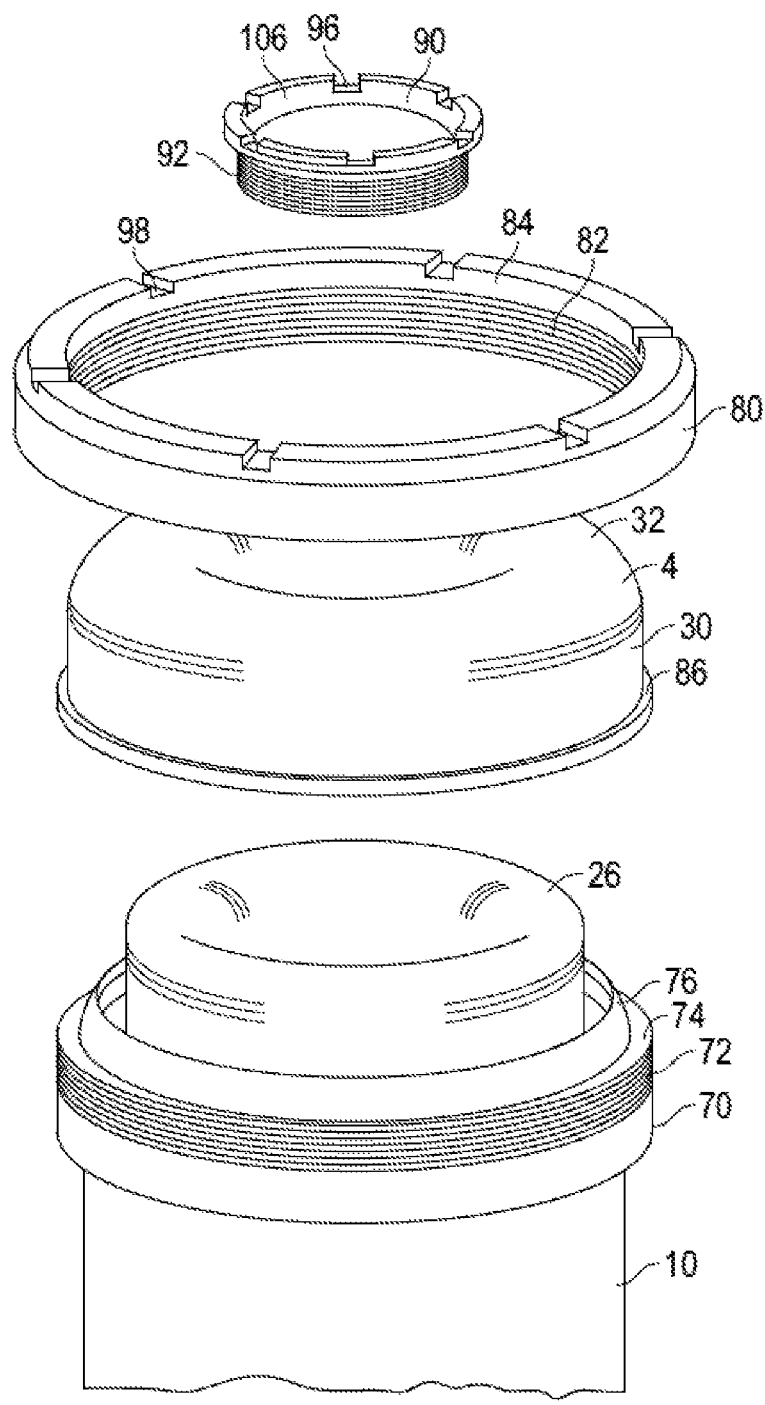
FIGS. 11 and 12 are exploded perspective and cross-sectional views, respectively, of another burner embodiment in accordance with the present disclosure.
Figure 12:
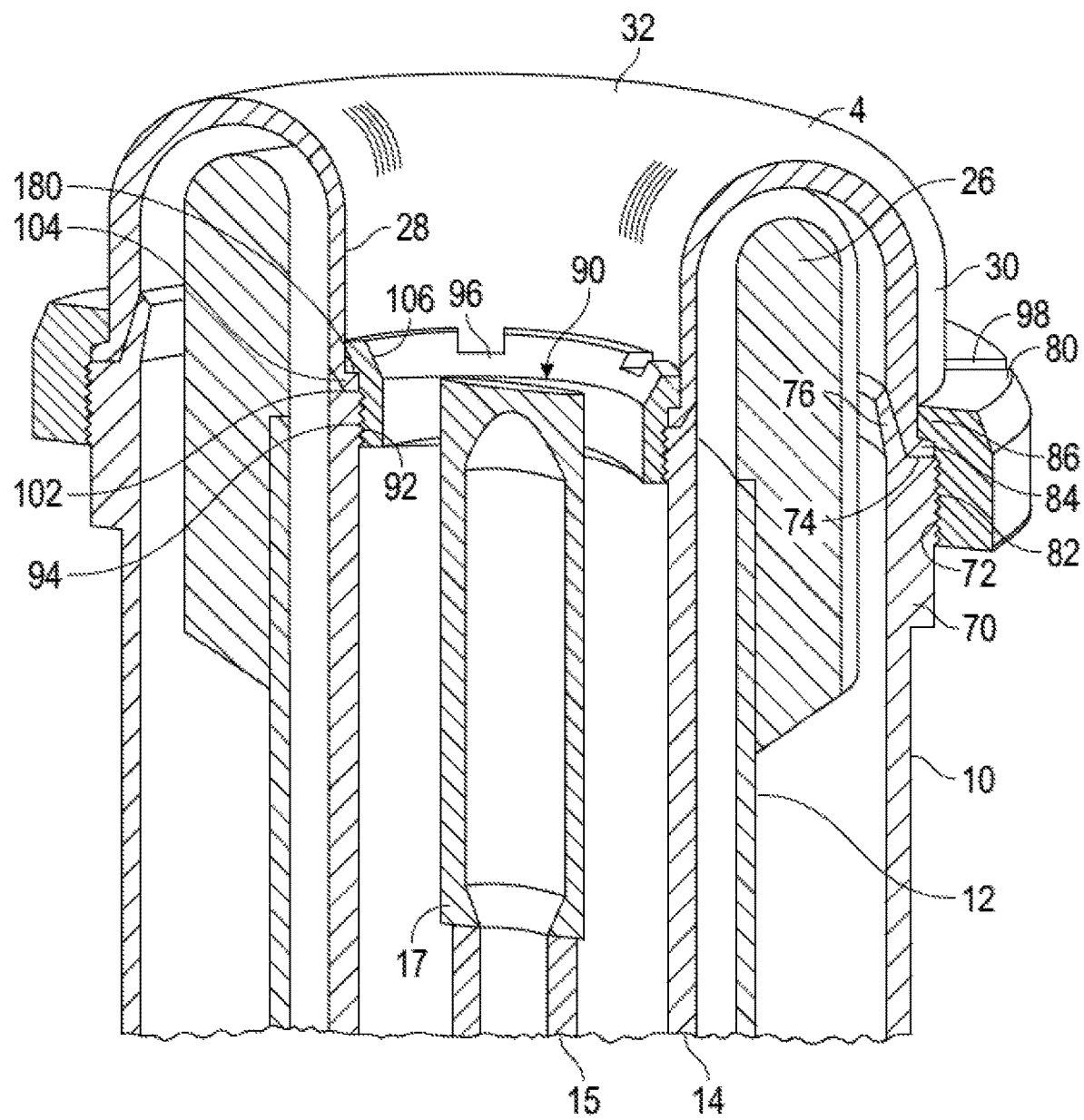

FIGS. 11 and 12 are exploded perspective and cross-sectional views, respectively, of another burner embodiment 400 in accordance with the present disclosure. An extension 70 of conduit 10 is provided in embodiment 400, having threads 72 on an external surface of extension 70, a shoulder 74, and a conical extension 76. A primary threaded ring 80 is provided, having threads 82 on an internal surface thereof which mate with threads 72, as well as an internal circumferential lip 84, which abuts an external circumferential lip 86 on burner tip 4 outer wall 30. A secondary threaded ring 90 is also provided in embodiment 400, having threads 92 on an outside surface thereof, mating with threads 94 provided on an internal surface of conduit 14. Optionally, one or more notches 96 may be provided for enabling easier turning for tightening and loosening secondary threaded ring 90. Optionally, one or more notches 98 may be provided for enabling easier turning for tightening and loosening primary threaded ring 80. As may be more clearly viewed in FIG. 12, a shoulder 102 on an end of conduit 14 is provided in embodiment 400, which abuts an internal circumferential lip on burner tip 4 inner wall 28. A conical extension 106 on secondary threaded ring 90 may be provided, and a downward-facing shoulder 108 on conical extension 106 abuts internal circumferential lip 104.

In certain embodiments the crown of the burner tip may include at least one physical convolution sufficient to increase surface area and fatigue resistance of the crown compared to a smooth, half-toroid crown of the same composition, as disclosed in Applicant's International Patent Application Number PCT/US13/42159, filed May 22, 2013, and may include brazed, flanged connections of the burner tip to the burner body such as disclosed in Applicant's International Patent Application Number PCT/US13/42153. Burner tip may be a formed, one-piece, integral Pt/Rh or other corrosion and fatigue resistant material as described in Applicant's International Patent Application Number PCT/US13/42182, filed May 22, 2013, now U.S. Pat. No. 10,131,563, issued Nov. 20, 2018. Burners may include a protective cap as described in Applicant's co-pending international patent application number PCT/US13/42254, now U.S. Pat. No. 10,138,151, issued Nov. 27, 2018. Burners may include a concave burner tip crown such as described in Applicant's International Patent Application Number PCT/US13/42147, now U.S. Pat. No. 9,777,922, issued Oct. 3, 2017.

If burner tip 4 is a formed, one-piece, integral Pt/Rh or other corrosion and fatigue resistant material as described in Applicant's International Patent Application Number PCT/US13/42182, filed May 22, 2013, now U.S. Patent No. 10,131,563, issued Nov. 20, 2018, the burner tip may be formed using a spin-forming operation. Other forming operations maybe employed, such as stamping, frictional stir welding, and the like. In spin-forming operations, a steel bar or other support may be used to rotate a conduit (or material for a burner tip) using a lathe or other rotation device. An end of a conduit is formed on one end with a lapped end using a mandrel and pressure. The ends of conduits and burner tip materials may be heated for softening to aid the spin forming process. Alternatively, an intermittent spinning with heating may be employed to relieve any work hardening. Spin forming is discussed in U.S. Pat. Nos. 6,694,791; 6,701,617; and 6,660,106. For thin metal pieces, such as noble metal burner tips, use of a pressurized bladder may be beneficial, such as discussed in U.S. Pat. No. 4,953,376, which discusses a process for necking-down a thin walled, deep drawn steel container. Frictional stir welding is described for example in U.S. Pat. Nos. 7,441,686; 7,748,592; and 6,536,651.

The physical dimensions of members 50, 52, 50', and 52', shaped ends 19, 29, 39, and 54, axial projections 56, 56', slots 58, 58', interlocking tabs 60, 60', opening receptacles 62, 62', and projections 64, 64' are not critical except for the feature that the members are initially just slightly smaller than the feature to which they are to be applied, and then, by manipulation or adjustment of temperature of the members and/or the feature to which they are to be applied, the members are temporarily large enough to just fit onto the respective feature. By adjusting temperature a second time, either of the members, the features to which they are applied, or both, the members are very tightly interference fit onto the features. The coefficient of thermal expansion ("CTE" or "α") of materials of the members and the features to which they are applied (conduit ends, outer and/or inner walls of burner tips) should be substantially similar so that they grow and contract at substantially the same rate. This means the CTE of the materials of the members and the features to which they are applied should be within 20%, or within 15%, or within 10%, or within 5%, or within 2%, or in certain embodiments within 0.5% or lower, where the percentage is measured as $(CTE_m - CTE_f)/CTE_f$, where "$CTE_m$" is the CTE of the material of the member (ring), and "$CTE_f$" is the CTE is the material of the feature to which the member is applied (conduit, inner wall or outer wall of burner tip). The linear coefficient of thermal expansion is defined as the fractional increase in length per unit rise in temperature. The coefficient of thermal expansion for a material is usually specified over a temperature range because it varies depending on the temperature. The values of CTE are typical reported for a temperature around 20° C. CTE is usually given in units of um/m/° K or ppm/° K. Relative values of CTE are reported in Table 2. With respect to the materials of the primary and secondary threaded rings, 80, 90 of embodiment 400 and similar embodiments, the CTE differences may not be as critical as in embodiment 100 and equivalent embodiments.

TABLE 2

Coefficient of linear thermal expansion of common materials

| Material | $\alpha$ ($10^{-6}$ K$^{-1}$) |
|---|---|
| Aluminum | 23.1 |
| barium ferrite | 10 |
| Brass | 20.3 |
| Chromium | 4.9 |
| Copper | 16.5 |
| Germanium | 6.1 |
| Glass | 8.5 |
| Gold | 14.2 |
| iron/nickel alloy (64% Fe, 36% Ni) | 1.2 |
| Iron | 11.8 |
| Lead | 28.9 |
| Nickel | 13.3 |
| Platinum | 8.8 |
| Plutonium | 54 |
| Silicon | 4.68 |
| Silver | 18.9 |
| solder, lead-tin | 25 |
| steel, stainless | 17.3 |
| steel, structural | 12 |
| Tin | 22 |
| Titanium | 8.5 |
| Tungsten | 4.5 |
| Uranium | 13.9 |
| Zinc | 30.2 |

Methods of producing molten glass using an SCM of this disclosure are considered another aspect of the disclosure. One embodiment may comprise flowing a fuel into the one or more fuel inlet ports and through a third annulus defined by the second internal conduit 14 and a central, concentric oxidant conduit 15. In these embodiments an oxidant flows into the one or more oxidant inlet ports and through the oxidant conduit 15, and the burner body and burner tip body are configured such that flow of oxidant out of the oxidant conduit and flow of fuel out of the third annulus causes the oxidant to intersect flow of the fuel in a mixing region at least partially defined by the generally central flow passage through the burner tip, combusting at least some of the fuel in the mixing region to form a flame and combustion products, and directing the flame and combustion products into solid and/or partially molten glass forming materials above the mixing region. Other method embodiments reverse the location of fuel and oxidant, with fuel flowing through the central third internal conduit and oxidant flowing through the third annulus.

In operation of burners and SCMs of the present disclosure, an inorganic glass-forming material is charged to the SCM. The mass flow rate of the inorganic material, for example glass-forming materials, is a function of the composition of the feed material, desired composition, viscosity, and temperature of the molten glass, the flame temperature of the burner(s), the burner geometry, for example burner exit, nozzle (if any) exit, annulus sizes, and non-central passage sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in the mixing region of the burners, after the gases have passed over a flame arrestor safety device. Varying the oxygen content of the oxidant can control the flame temperature of the combustion gases.

Conduits of burner bodies and associated components (such as spacers and supports between conduits, but not burner tips) used in SC burners, SCMs and processes of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the burners and/or space required for burners.

In general, central internal conduit 15 may have an inner diameter (ID) ranging from about 1 inch up to about 5 inches (2.5 cm to 13 cm), or from about 2 inches up to about 4 inches (5 cm to 10 cm), with other burner conduits sized accordingly.

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 150 of burners in accordance with the present disclosure should not exceed about 10 psig (170 kPa absolute pressure).

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 15, in addition to a secondary or tertiary oxidant injection in the third annulus.

SC burners and methods of melting glass-forming materials of the present disclosure are intended to be used, for example, to replace some or all combustion burners in existing SCMs, and/or to be used as the main source of energy in new SCMs.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A fluid-cooled combustion burner comprising:
a burner body comprising an external nickel-based alloy conduit and a first internal nickel-based alloy conduit substantially concentric with the external nickel-based alloy conduit, and positioned internal of the external nickel-based alloy conduit, the external nickel-based alloy conduit comprising a first end, a second end, and a longitudinal bore having a longitudinal axis, the first internal nickel-based alloy conduit comprising a first end, a second end, and a longitudinal bore having a longitudinal axis, the external nickel-based alloy conduit and first internal nickel-based alloy conduit defining a first annulus for passing a cooling fluid there between, and a second internal nickel-based alloy conduit substantially concentric with, and positioned internal of the first internal nickel-based alloy conduit, the second internal nickel-based alloy conduit comprising a first end, a second end, and a longitudinal bore having a longitudinal axis, and configured to define a second annulus between the first and second internal nickel-based alloy conduits, the burner body comprising fuel and oxidant inlet ports near the second ends of the conduits, and a third internal conduit substantially concentric with and positioned internal of the second internal nickel-based alloy conduit; and
a platinum-rhodium alloy burner tip defined by a platinum-rhodium alloy inner wall, a platinum-rhodium alloy outer wall, and a platinum-rhodium alloy crown, the platinum-rhodium alloy outer wall removably fixed to the first end of the external nickel-based alloy conduit via an outer connection, and the platinum-rhodium alloy inner wall removably fixed to the first end of the second internal nickel-based alloy conduit via an inner connection, the platinum-rhodium alloy burner tip comprising a generally central flow passage configured to pass a combustible mixture therethrough, the generally central flow passage defined by the platinum-rhodium alloy inner wall;
wherein the outer connection comprises a first member comprising a titanium alloy and a second member comprising a titanium alloy interference fit to complementary portions of the platinum-rhodium alloy burner tip and burner body, respectively, the first member comprising a titanium alloy and the second member comprising a titanium alloy joined to each other via a heat-formed seam.

2. The fluid-cooled combustion burner of claim 1 wherein the heat-formed seam is formed by a process selected from welding, soldering, brazing, and combinations thereof.

3. The fluid-cooled combustion burner of claim 2 wherein the heat-formed seam is formed by fiber welding.

4. The fluid-cooled combustion burner of claim 1 wherein the titanium alloy of the first member has a coefficient of thermal expansion within about 10% of a coefficient of thermal expansion of the platinum-rhodium alloy of the platinum-rhodium burner tip, and wherein the titanium alloy of the second member has a coefficient of thermal expansion within about 10% of a coefficient of thermal expansion of material comprising the external nickel-based alloy conduit.

5. The fluid-cooled combustion burner of claim 1 wherein the interference fit of the first member comprising a titanium alloy to the platinum-rhodium alloy burner tip is an interference fit of a first titanium alloy ring to a shaped end of the platinum-rhodium alloy outer wall, and the interference fit of the second member comprising a titanium alloy to the burner body is an interference fit of a second titanium alloy ring to the first end of the external nickel-based alloy conduit.

6. The fluid-cooled combustion burner of claim 5 wherein:
(a) the interference fit of the first titanium alloy ring to the shaped end of the platinum-rhodium alloy outer wall is a first interference fit formed by adjusting temperature of the platinum-rhodium alloy burner tip and first titanium alloy ring, the first titanium alloy ring having a smaller initial diameter than the shaped end of the platinum-rhodium alloy outer wall of the platinum-rhodium alloy burner tip, to cause the first titanium alloy ring diameter to be greater than a diameter of the shaped end of the platinum-rhodium alloy outer wall, placing the first titanium alloy ring in position adjacent the shaped end of the platinum-rhodium alloy outer wall, and adjusting temperature of the first titanium alloy ring and the platinum-rhodium alloy burner tip to form the first interference fit, or
(b) the interference fit of the second titanium alloy ring to the burner body is a second interference fit formed by adjusting temperature of the burner body and the second titanium alloy ring, the second titanium alloy ring having a smaller initial diameter than the first end of the external nickel-based alloy conduit, to cause the second titanium alloy ring diameter to be greater than a diameter of the first end of the external nickel-based alloy conduit, placing the second titanium alloy ring in position adjacent the first end of the external nickel-based alloy conduit, and adjusting temperature of the second titanium alloy ring and burner body to form the second interference fit, or
(c) both (a) and (b).

7. The fluid-cooled combustion burner of claim 6 wherein:
(a) the shaped end of the platinum-rhodium alloy outer wall comprises one or more axial projections defining one or more receptacles in which are positioned corresponding one or more radially inward projecting interlocking tabs carried by the first titanium alloy ring, or
(b) the first end of the external nickel-based alloy conduit comprises one or more axial projections defining one or more slots in which are positioned corresponding one or more radially inward projecting interlocking tabs carried by the second titanium alloy ring, or
(c) both (a) and (b).

8. The fluid-cooled combustion burner of claim 1 wherein the second titanium alloy ring includes a plurality of circumferentially spaced outward opening receptacles in which are positioned a corresponding plurality of mating projections on the first titanium alloy ring.

9. The fluid-cooled combustion burner of claim 1 wherein the titanium alloy first and second members have melting temperatures at least 20° C. higher than the external nickel-based alloy conduit and platinum-rhodium alloy burner tip, and wherein the titanium alloy first and second members have coefficients of thermal expansion substantially similar to the platinum-rhodium alloy burner tip and the external nickel-based alloy conduit so that the titanium alloy first and second members, platinum-rhodium alloy burner tip, and external nickel-based alloy conduit expand and contract at substantially the same rate.

10. A submerged combustion melter comprising at least one fluid-cooled combustion burner of claim 1.

11. A fluid-cooled combustion burner comprising:
a burner body comprising an external nickel-based alloy conduit and a first internal nickel-based alloy conduit substantially concentric with the external nickel-based alloy conduit, and positioned internal of the external nickel-based alloy conduit, the external nickel-based alloy conduit comprising a first end, a second end, and a longitudinal bore having a longitudinal axis (A), the first internal nickel-based alloy conduit comprising a first end, a second end, and a longitudinal bore having a longitudinal axis, the external nickel-based alloy conduit and first internal nickel-based alloy conduit defining a first annulus for passing a cooling fluid there between, and a second internal nickel-based alloy conduit substantially concentric with, and positioned internal of the first internal nickel-based alloy conduit, the second internal nickel-based alloy conduit comprising a first end, a second end, and a longitudinal bore having a longitudinal axis, and configured to define a second annulus between the first and second internal nickel-based alloy conduits, the burner body comprising fuel and oxidant inlet ports near the second ends of the conduits, and a third internal conduit substantially concentric with and positioned internal of the second internal nickel-based alloy conduit; and
a platinum-rhodium alloy burner tip defined by a platinum-rhodium alloy inner wall, a platinum-rhodium alloy outer wall, and a platinum-rhodium alloy crown, the platinum-rhodium alloy outer wall removably fixed to the first end of the external nickel-based alloy conduit via an outer connection, and the platinum-rhodium alloy inner wall removably fixed to the first end of the second internal nickel-based alloy conduit via an inner connection, the platinum-rhodium alloy burner tip comprising a generally central flow passage configured to pass a combustible mixture therethrough, the generally central flow passage defined by the platinum-rhodium alloy inner wall;
wherein the outer connection comprises same or different titanium alloy first and second rings interference fit to complementary portions of the platinum-rhodium alloy burner tip platinum-rhodium alloy outer wall and burner body external nickel-based alloy conduit, respectively, the first and second titanium alloy rings joined to each other via a first heat-formed seam; and
wherein the inner connection comprises same or different titanium alloy third and fourth rings interference fit to complementary portions of the burner tip platinum-rhodium alloy inner wall and the burner body second internal nickel-based alloy conduit, respectively, the titanium alloy third and fourth rings joined to each other via a second heat-formed seam.

12. The fluid-cooled combustion burner of claim 11 wherein:
the heat-formed seams are formed by fiber welding;
the first, second, third, and fourth titanium alloy rings independently comprise a third material different from the platinum-rhodium alloy burner tip and the external nickel-based alloy conduit.

13. The fluid-cooled combustion burner of claim 11 wherein:
(a) an end of each of the outer and inner platinum-rhodium alloy walls each comprise two or more axial projections defining one or more receptacles in which are positioned corresponding one or more radially inward projecting interlocking tabs carried by the first and third titanium alloy rings, respectively, or
(b) the first end of the external nickel-based alloy conduit and the first end of the second internal nickel-based alloy conduit each comprise two or more axial projections defining one or more slots in which are positioned corresponding one or more radially inward projecting interlocking tabs carried by the second and fourth titanium alloy rings, respectively, or
(c) both (a) and (b).

14. A submerged combustion melter comprising at least one fluid-cooled combustion burner of claim 11.

* * * * *